July 26, 1932.　　　W. B. SMITH　　　1,868,855
GIN SAW GUMMING MACHINE
Filed July 24, 1931　　　5 Sheets-Sheet 2

Inventor
W. B. Smith
By C. A. Snow & Co.
Attorneys.

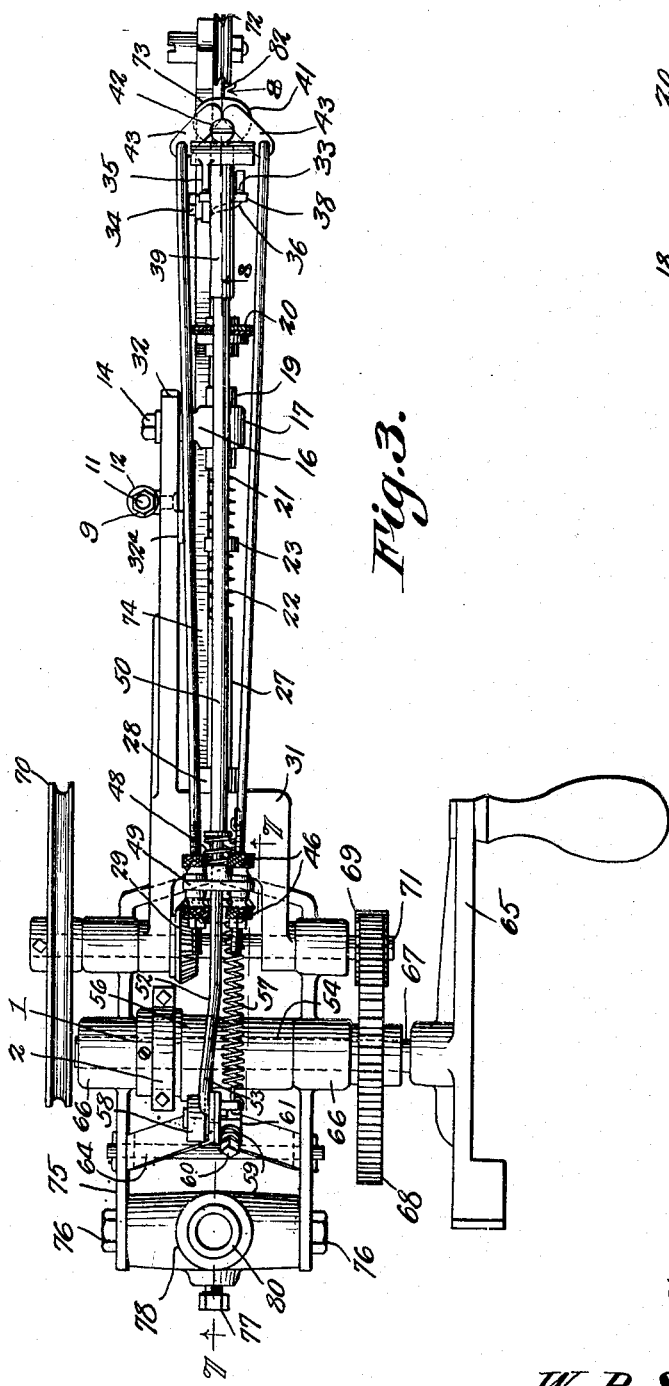

July 26, 1932.  W. B. SMITH  1,868,855
GIN SAW GUMMING MACHINE
Filed July 24, 1931  5 Sheets-Sheet 5
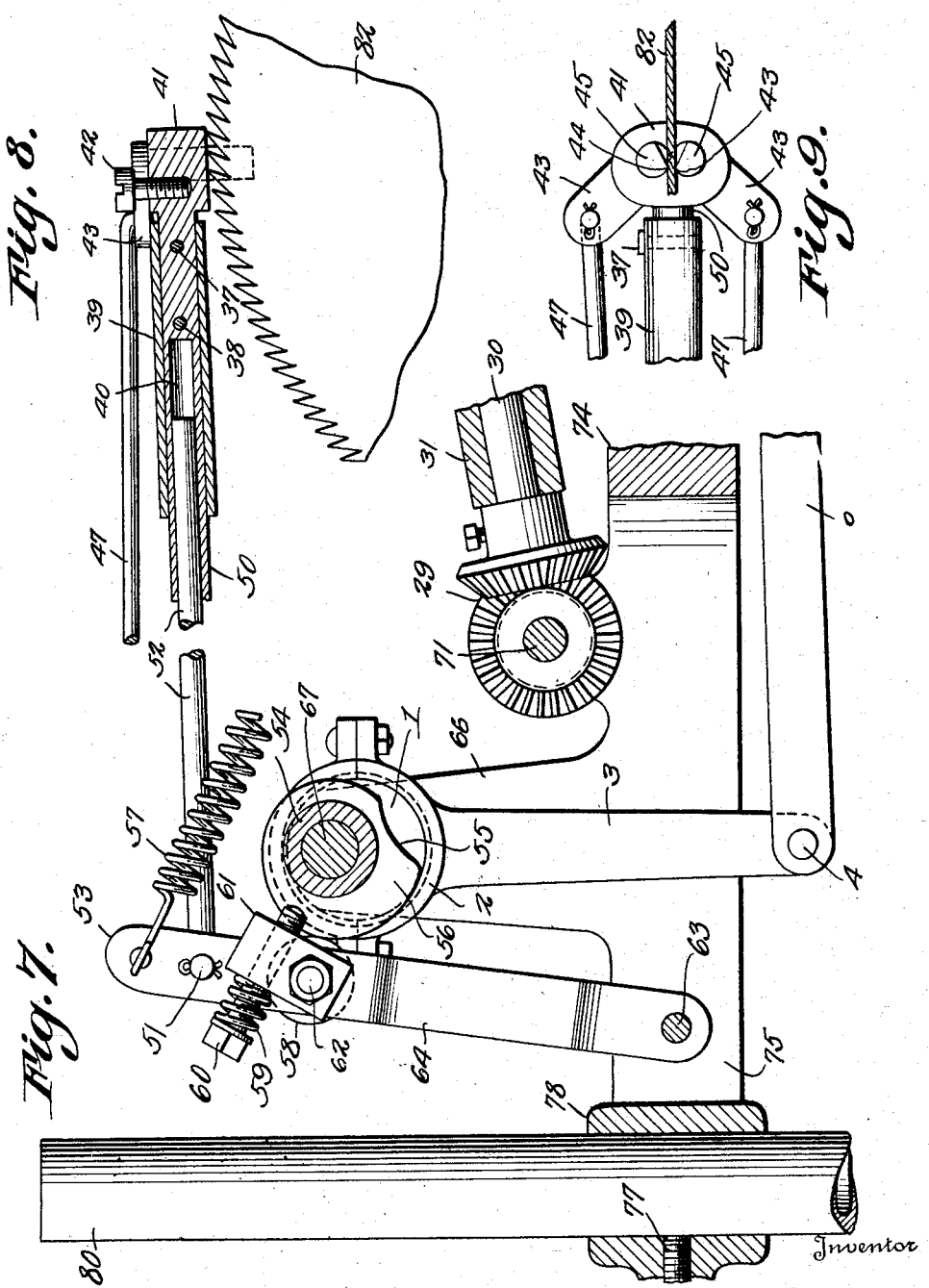

Patented July 26, 1932

1,868,855

UNITED STATES PATENT OFFICE

WILLIAM BUNION SMITH, OF HARTSELLE, ALABAMA

GIN SAW GUMMING MACHINE

Application filed July 24, 1931. Serial No. 552,932.

The device forming the subject matter of this application is adapted to be used for gumming saws, particularly gin saws. One object of the invention is to provide novel means for carrying the device in operative relation to the gin saw. Another object of the invention is to supply novel means for raising and lowering the gumming disc with respect to the gin saw. Another object of the invention is to provide novel means for imparting step by step movement to the gin saw, so that successive teeth may be presented to the gumming disc.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 3 is a top plan;

Figure 4 is a longitudinal sectional view showing the telescopic shaft which operates the gumming disc;

Figure 7 is a section on the line 7—7 of Figure 3;

Figure 8 is a section on the line 8—8 of Figure 3.

Figure 9 is a bottom plan view illustrating the saw-gripping means.

Figure 1:
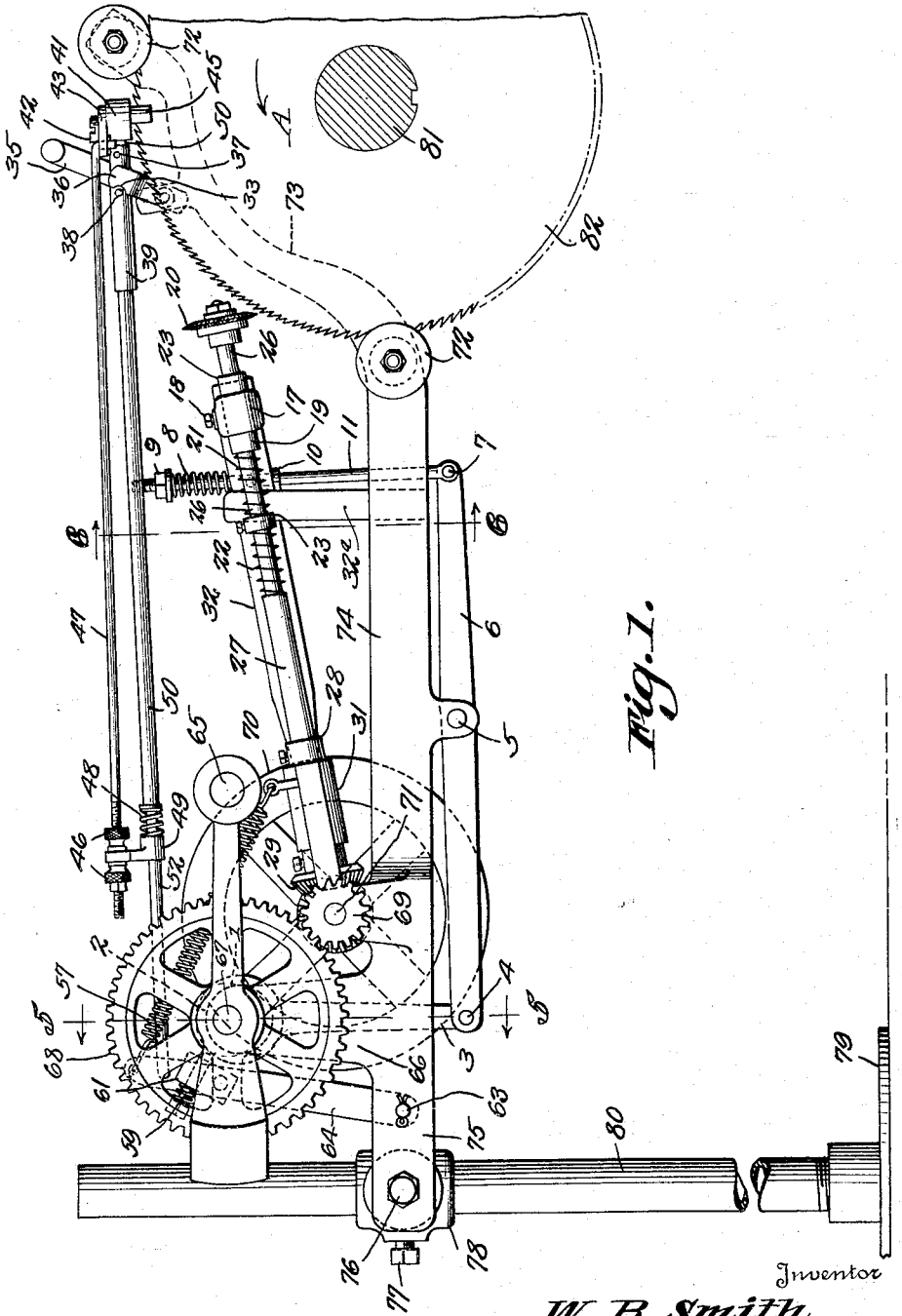
Figure 1 shows in side elevation, a device constructed in accordance with the invention, parts being broken away.
Figure 2:
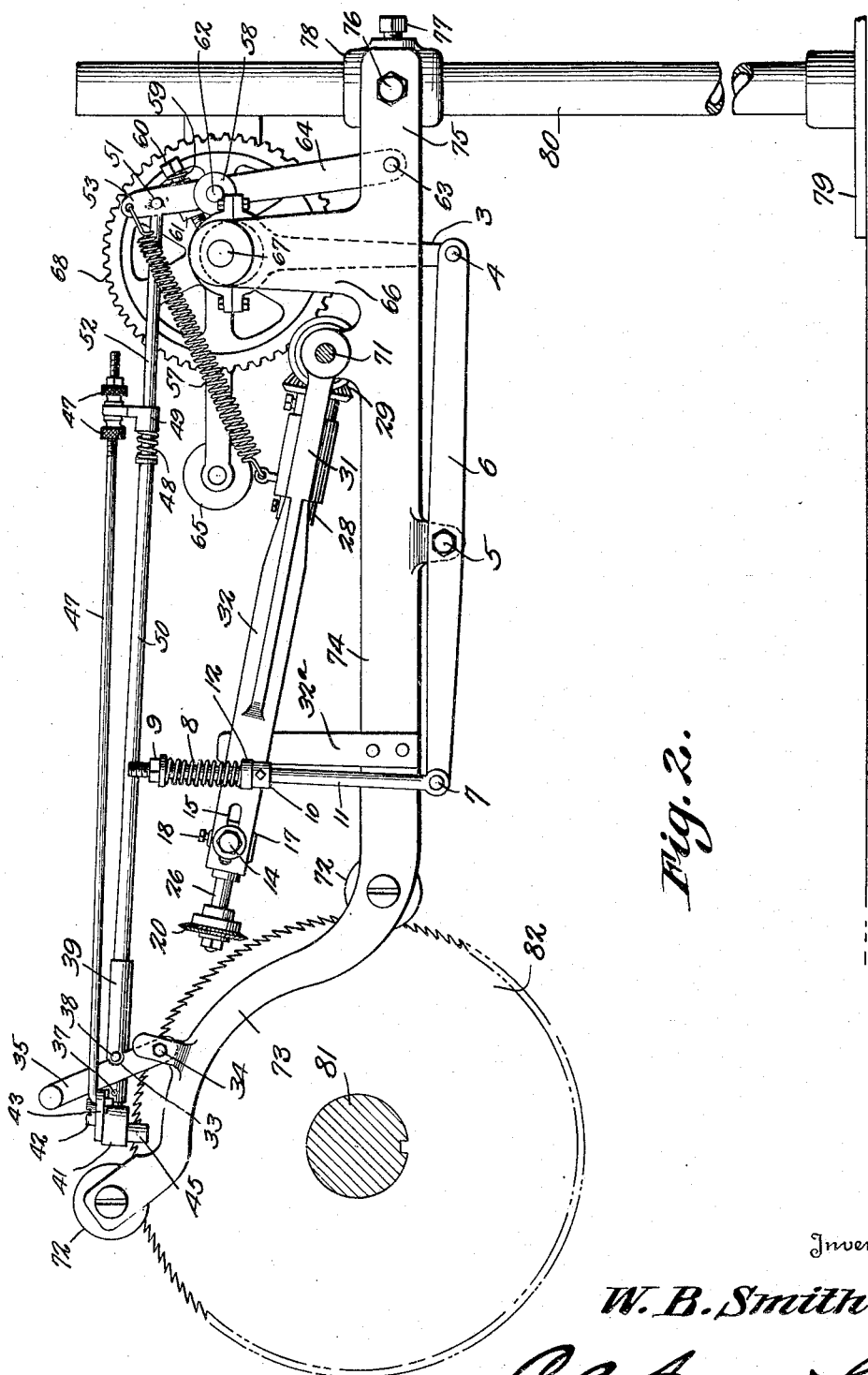
Figure 2 is a side elevation.

In Figures 1 and 2, the numeral 82 designates a gin saw or other saw which is to be gummed, the shaft which carries the saw being designated by the numeral 81. For the support of the device hereinafter described, there is provided a vertical post 80 mounted on a base 79, secured to the floor of the house, in convenient relation to the gin saw 82.

A collar 78 is vertically adjustable on the post 80, and is held in place by a set screw 77. Pivoted at 76 to the collar 78 is a fork 75 on the rear end of a member 74 in the form of a substantially horizontal bar, and this member may be denominated a support, because practically all of the moving parts of the device are mounted on it, either mediately or immediately. The support 74 has an upwardly extended end 73, adapted to project between the gin saws 82 which are to be gummed. Grooved wheels 72 are journaled on the end 73 of the support 1, and cooperate with the gin saw 82, to maintain the support in the substantially horizontal position disclosed in Figure 2 of the drawings.

A transverse shaft 71 (Figures 1 and 3) is journaled for rotation on the support 74. On one end of the shaft 71 is a pulley 70, whereby the shaft may be rotated by power, if so desired. A means is provided, however, whereby the shaft 71 may be rotated by hand, and this means embodies a pinion 69 (Figure 1) secured to shaft 71, and meshing with a gear wheel 68, secured to a shaft 67 (Figures 3 and 5) disposed transversely of the machine and journaled in standards 66 (Figure 2) on the fork 75 of the support 74. Rotation is imparted to the shaft 67 by means of a crank 65, or in any other appropriate way.

Figure 5:
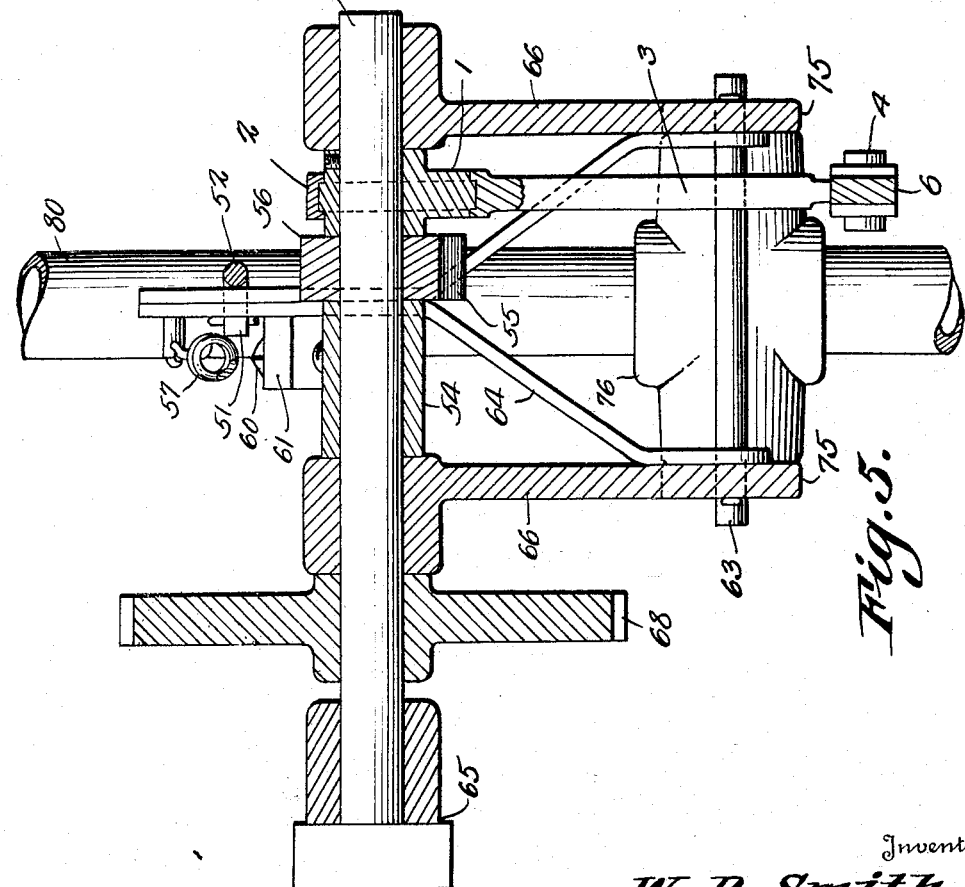
Figure 5 is a transverse section on the line 5—5 of Figure 1.

Figure 7 shows that the lower end of a radius arm 64 is pivoted at 63 to the fork 75 of the support 74, and Figure 5 shows that the radius arm 64 is of inverted Y shape. By means of a clamp bolt 62 (Figure 7) a bracket 61 is secured adjustably to the radius arm 64. An adjustable member 60, such as a screw, is mounted in the bracket 61. The screw 60 is prevented from turning, and losing its adjustment, by means of a compression spring 59, surrounding a portion of the screw, one end of the spring abutting against the head of the screw, and the opposite end of the spring abutting against the bracket 61.

On one end of the clamp bolt 62 there is journaled a roller 58 (Figures 3 and 2), a pull spring 57 being connected to the radius arm 64, to cause the roller 58 to cooperate with a cam 56 (Figures 7 and 3) secured to the shaft 67. The cam 56 has a depression 55, which the roller 58 is adapted to enter, and when the radius arm 64 swings to the right in Figure 7, to permit the roller 58 to enter the depression 55 of the cam 56, the aforesaid swinging movement of the radius arm 64 is terminated when the inner end of the screw 60 comes into contact with the collar 54. For all practical purposes the collar may be considered as a part of the shaft 67 on which it is mounted.

To the upper end 53 of the radius arm 64 is pivoted at 51, the rear end of a feed rod 52. Figure 8 shows that the forward end of the feed rod 52 is telescoped in a sleeve 50, an abutment 59 (Figures 2, 1 and 3) being secured to the feed rod 52. A compression spring 48 is mounted on the feed rod 52 and is interposed between the abutment 49 and the adjacent end of the sleeve 50.

Figure 6:
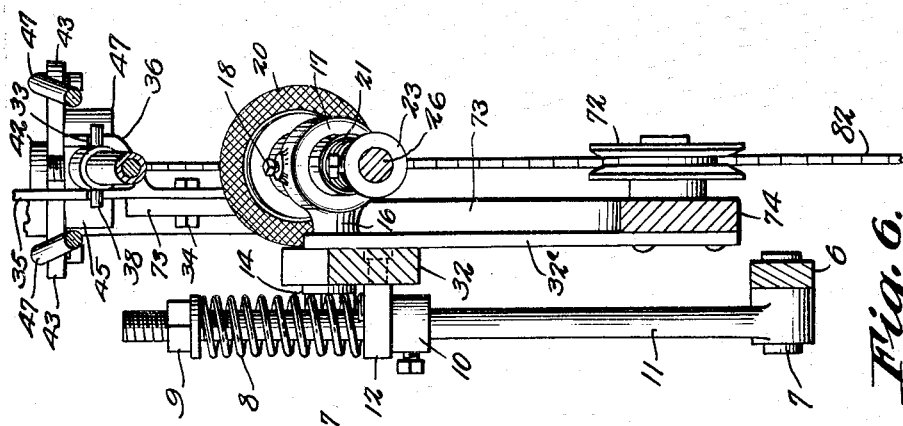
Figure 6 is a transverse section on the line 6—6 of Figure 1.

The rear ends of connecting rods 47 (Figures 1 and 3) are held adjustably, by means of nuts 46, in the abutment 49. Gripping cams 45 (Figures 9 and 1) are located on opposite sides of the gin saw 82 and have vertical edges 44 adapted to engage the gin saw. The cams have oppositely extended arms 43, in which the forward ends of the connecting rods 47 are pivoted, the cams being mounted to rock in a bearing 41 on the forward end of the sleeve 50. The arms 43 of the cams 45 move beneath the end of a retainer or screw 42 (Figures 6 and 8) mounted in the bearing 41. As seen in Figure 8, the sleeve 50 has a bore 40, in which the feed rod 52 is telescopically received. A reenforcing tube 39 (Figures 8 and 1) covers the forward portion of the sleeve 50, and strengthens it, in that portion of the sleeve which is not occupied by the forward end of the feed rod 52.

The tube 39 is held in place by a cross pin 38, and by a securing element 37 engaged with the tube and with the forward, solid portion of the sleeve 50. A hand lever 35 is fulcrumed at 34 (Figure 2) on the end 73 of the support 74. Comparing Figures 6 and 1, the drawings show that the hand lever 35 carries an offset arm 36, the lever and the arm being located in front of the cross pin 38, and having seats 33, adapted to receive the cross pin.

An arm 32 (Figures 2 and 3) is provided, and at its rear end, the arm 32 has a fork 31, by which the arm 32 is mounted to swing up and down on the shaft 71, along a vertical guides 32a (Figures 6 and 1), carried by the support 74. Figure 4 discloses that the device comprises a telescopic shaft, one member 30 of which is journaled for rotation in the fork 31 at the back end of the arm 32. The shaft member 30 is connected by bevelled gears 29 with the shaft 71. Longitudinal movement of the shaft 30 in the butt of the fork 31 is prevented by a collar 28 (Figure 3 and 4) held on the shaft 30 by a set screw. In advance of the collar 28, the shaft 30 is surrounded by a sleeve 27, and into the sleeve 27, extends, slidably, a forward shaft 26 having a reduced end 25 received slidably in a slot 24 formed in the shaft 30 within the sleeve 27.

An abutment collar 23 is secured to the shaft 26, by a set screw, and is located in front of the sleeve 27. The shaft 26 is surrounded by a compression spring 22, the rear end of the spring 22 abutting against the forward end of the sleeve 27, and the forward end of the spring engaging the member 23. The shaft 26 is surrounded by a compression spring 21, the rear end of which engages the abutment collar 23. The forward end of the spring 22 abuts against a bearing 19, in which the shaft 26 is journaled, a gumming disc 20 being secured to the forward end of the shaft 26.

The bearing 19 is held by a set screw 18 (Figure 4) in a collar 17 (Figure 6) having a stem 16 received in a slot 15 (Figure 2) formed in the forward end of the arm 32. The collar 17, therefore, can be adjusted lengthwise of the arm 32, and it is held in adjusted positions by a clamp screw 14 threaded into the end of the stem 16 and engaging one side of the arm 32.

There is a laterally extended lug 12 (Figures 6 and 2) which is pivoted to the arm 32. In the lug 12 is mounted a substantially vertical connecting rod 11, provided with an adjustable collar 10, constituting a shoulder, which engages beneath the lug 12. On the upper end of the connecting rod 11 is an adjusting device 9, preferably a nut. A compression spring 8 surrounds a portion of the rod 11 and is interposed between the lug 12 and the adjusting device 9. It can be seen in Figure 2 that the lower end of the connecting rod 11 is pivoted at 7 to a substantially horizontal lever 6, the lever 6 being fulcrumed at 5, intermediate its ends, on the support 74. The lever 6 is pivoted at 4 (Figure 1) to an eccentric rod 3 (Figure 7) provided at its upper end with a strap 2 cooperating with an eccentric 1 secured to the shaft 67.

In practical operation, rotation is imparted to the second shaft 71, either directly, by way of the pulley 70, or indirectly, from the first shaft 67, through the instrumentality of the crank 65, the gear wheel 68, and the pinion 69. Referring to Figures 7 and 8, it will be obvious that whilst the roller 58 is riding on the cam 56, the radius arm 64 and the feed rod 52 are moving to the left. It is at this time that the gin saw 82 is turned in the direction of the arrow A in Figure 1, to bring a new tooth under the gumming disc 20, the gumming disc and the arm 32 being raised, because the eccentric 1 of Figure 7, the strap 2, the rod 3, the lever 6 of Figure 2, and the rod 11 are in such position that the shoulder 10 on the rod 11 presses upwardly on the lug 12 of the arm 32, and swings the arm upwardly with the shaft 71 as a center. The spring 8 is an adjustable cushioning spring that comes into play during the downward movement of the arm 32.

When the cam 56 of Figure 7 has turned far enough, the roller 58 on the arm 64 enters the depression 55 of the cam 56. The arm 64 swings to the right under the action of the spring 57 which is anchored to the arm 32, until the screw 60 engages at its end with the collar 54 on the first shaft 67, thus stopping the swinging movement of the arm 64 to the right. As the arm 64 moves to the right, the rod 52 and the gripping cams 45 move to the right also, the cams sliding over the saw 82, without imparting rotation to the saw in a direction opposite to that indicated by the arrow A in Figure 1. The particular way in which the cams 45 operate to grip the saw 82 and turn it, and to loosen their hold on the saw, and slide upon it, will be explained hereinafter.

It is whilst the gripping cams 45 are sliding to the right in Figure 1, with the saw 82 at rest, that the gumming disc 20, having been lowered between the teeth of the saw 82, gets in its work. The gumming disc 20 is rotated by a train of elements comprising the shafts 26 and 30 of Figure 4, the bevelled gears 29 of Figure 7, and the shaft 71 of Figure 1. The reason for having the telescopic, spring-controlled shaft 26—30 of Figure 4 is that if the teeth of the saw 82 do not happen to be regularly and accurately stepped, around the periphery of the saw, the shaft 26—30 will yield longitudinally, and prevent the gumming disc 20 from cutting away any tooth that happens to be a little out of place.

Continued rotation of the first shaft 67 causes the roller 58 on the arm 64 to ride out of the depression 55 of the cam 56. The cam 56 then swings the arm 64 into the position of Figure 7, the rod 52 and the sleeve 50 moving to the left in Figures 7 and 8, the gripping cams 45 pulling the saw 82 around in the direction of the arrow A in Figure 1, by the space of one tooth, the eccentric 1, the rod 3, the lever 6, the rod 11, the shoulder 10, and the lug 12 operating to swing up the arm 32 and raise the disc 20 out of engagement with the teeth of the saw 82, whilst the saw is being turned, to present a new tooth, as aforesaid.

As to the operation of the gripping cams 45 with respect to the saw 82, the spring 48 has a tendency to shove the tube 50 and the bearing 41 to the right in Figures 1, 9 and 8, whereas the connecting rods 47 hold back on the arms 43 of the gripping cams 45. The result is that when the feed rod 52 and the sleeve 50 are carried to the left in Figures 8 and 9, by the action of the cam 56 on the radius arm 64, the edges 44 of the gripping cams 45 engage the saw 82, as in Figure 9, and the saw is turned in the direction of the arrow A in Figure 1, thereby advancing a new tooth with respect to the gumming disc or tool 20. When, however, the feed rod 52 and the sleeve 50 are moved to the right in Figure 9, the hold of the gripping cams 45 on the saw 82 is loosened, and the cams move to the right in Figure 9, to get a new hold on the saw.

If the operator wishes to loosen the gripping cams 45 on the saw 82, to shift the device over to another saw, the lever 35 is swung to the left in Figure 1. The sleeve 50 is moved to the left, by means of the cross pin 38 that cooperates with the lever 35—36, the rods 47 stay in a position of Figure 9, so far as longitudinal movement is concerned, the arms 43 are swung to the right in Figure 9, and the hold of the cams 45 on the sides of the saw 82 is loosened.

The machine may be used for side files, and can be employed in that way, without structural change. The general design of the machine promotes strength and compactness. The arm 32 and the means for mounting and operating it are highly useful. The deeply grooved wheels 72 aid in enhancing the utility of the machine and their grooves may be either rough or smooth. A novel means is provided for operating the grips 45 to engage and release the saw 82, and a novel means is provided for moving the grips, to turn the saw 82 in the direction of the arrow A. The advantages of the telescopic shaft 26 for the gummer 20, have been brought out hereinbefore. These, and other features of novelty, will commend the device to those skilled in the art.

Having thus described the invention, what is claimed is:

1. In a device of the class described, a support, first and second transverse shafts journaled on the support, means for connecting the shafts operatively, means for rotating one shaft, an eccentric on the first shaft, a cam on the first shaft and having a depression, a substantially straight radius arm mounted at its lower end to swing on the support and having a projection riding on the cam and entering the depression, a saw-feeding means connected to the radius arm and operated when the projection leaves the depression, a longitudinal arm mounted to swing on the second shaft, a longitudinal shaft journaled on the longitudinal arm, a saw-working tool driven by the longitudinal shaft, means for driving the longitudinal shaft from the second shaft, a substantially straight lever fulcrumed intermediate its ends on the lower portion of the support, an eccentric rod pivoted directly to one end of the lever, a strap on the eccentric rod and cooperating with the eccentric, a second rod pivotally connected to the longitudinal arm and pivoted directly to the opposite end of the lever, the eccentric and the cam being so set with respect to each other, circumferentially of the first shaft, that the longitudinal arm will be actuated to dispose the saw-working tool in inoperative position whilst the projection is out of the depression and the radius arm and the feeding means are being actuated to present a new portion of the saw to the saw-working tool, and an adjustable member carried by the radius arm and cooperating with the first shaft to regulate the amount that the projection enters the depression of the cam.

2. In a device of the class described, a support, a saw-feeding rod, means for mounting the rod for reciprocation, means for imparting the reciprocation to the rod, a sleeve slidable on the rod, an abutment carried by the rod, a spring interposed between the sleeve and the abutment, saw-engaging grips mounted to swing on the sleeve and having crank arms, members of a predetermined length carried by the abutment and pivoted to the arms, a saw-working tool, and means for mounting the tool for movement toward and away from the saw in synchronism with the movement of the saw grips.

3. In a device of the class described, a support, a saw-feeding rod, means for mounting the rod for reciprocation, and for swinging movement toward and away from the saw which is being worked upon, means for imparting reciprocation to the rod, a sleeve slidable on the rod, an abutment carried by the rod, a spring interposed between the sleeve and the abutment, saw-engaging grips mounted to swing on the sleeve and having crank arms, members of a predetermined length carried by the abutment and pivoted to the arms, a saw-working tool, means for mounting the tool for movement toward and away from the saw in synchronism with the movement of the grips, and means carried by the support and cooperating with the sleeve to move the saw grips clear of the saw at the will of an operator.

4. In a device of the class described, a support, a saw-feeding member, means for mounting the saw-feeding member for reciprocation and for swinging movement toward and away from the saw which is being worked upon, means for imparting reciprocation to the saw-feeding member, means carried by the support and cooperating with the saw-feeding member to move the saw-feeding member away from the saw, at the will of an operator, the saw-feeding member comprising telescopic parts, saw-engaging grips mounted to swing on one of said telescopic members, the saw grips having crank arms, connections of a predetermined length uniting the crank arms with the other of said telescopic members, and spring means for producing relative movement between said telescopic members.

In testimony that I claim the foregoing as my own, I have hereto affixed my signature.

WILLIAM BUNION $\overset{\text{his}}{\times}$ SMITH.
mark

Witnesses to mark—
M. M. KITCHENS,
W. J. SPARKMAN.